United States Patent [19]

Donovan et al.

[11] Patent Number: 6,012,032
[45] Date of Patent: *Jan. 4, 2000

[54] SYSTEM AND METHOD FOR ACCOUNTING OF COMPUTER DATA STORAGE UTILIZATION

[75] Inventors: Joseph M. Donovan, McKinney; Charles D. James, Celina, both of Tex.

[73] Assignee: Electronic Data Systems Corporation, Plano, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/566,416

[22] Filed: Nov. 30, 1995

[51] Int. Cl.[7] .............................. G06F 12/02; G06F 13/10
[52] U.S. Cl. ................................. 705/1; 707/200
[58] Field of Search .................. 395/201, 401, 395/427, 838; 705/1, 28, 30; 707/1, 9, 10, 200

[56] References Cited

U.S. PATENT DOCUMENTS

| | | | |
|---|---|---|---|
| 4,065,663 | 12/1977 | Edwards, II | 364/464 |
| 5,018,060 | 5/1991 | Gelb et al. | 364/200 |
| 5,355,327 | 10/1994 | Stent et al. | 364/551.01 |

FOREIGN PATENT DOCUMENTS

WO 96/07151   3/1993   WIPO ........................... G06F 17/60

OTHER PUBLICATIONS

Paul McCormick, "Storing and Moving the Data Source", Software Magazine, vol. 8, No. 3, pp. 48–55, Mar. 1988.
Rubbin Juris, "Automaker, Automate Thyself", Computer Decisions, v. 18, pp. 32–36, Feb. 25, 1986.
IBM Technical Disclosure Bulletin, vol. 17, No. 4, Sep. 1974, entitled "Comprehensive Computer Accounting System" by H.W. Fischbeck and J.F. Harris.
IBM Technical Disclosure Bulletin, vol. 37, No. 6B, Jun. 1994, entitled "Multimedia Audio on Demand".

*Primary Examiner*—Frantzy Poinvil
*Attorney, Agent, or Firm*—L. Joy Griebenow; Baker & Botts L.L.P.

[57] ABSTRACT

A system and method (10) of accounting and billing for data storage on a plurality of data storage devices (20) are provided. The data storage is mapped to a number of service levels, which specify varying data access and retrieval speeds. Therefore, instead of accounting and billing for data storage solely on the basis of quantity of data, it is done on the basis of data access and retrieval speeds required by each data storage application.

29 Claims, 4 Drawing Sheets

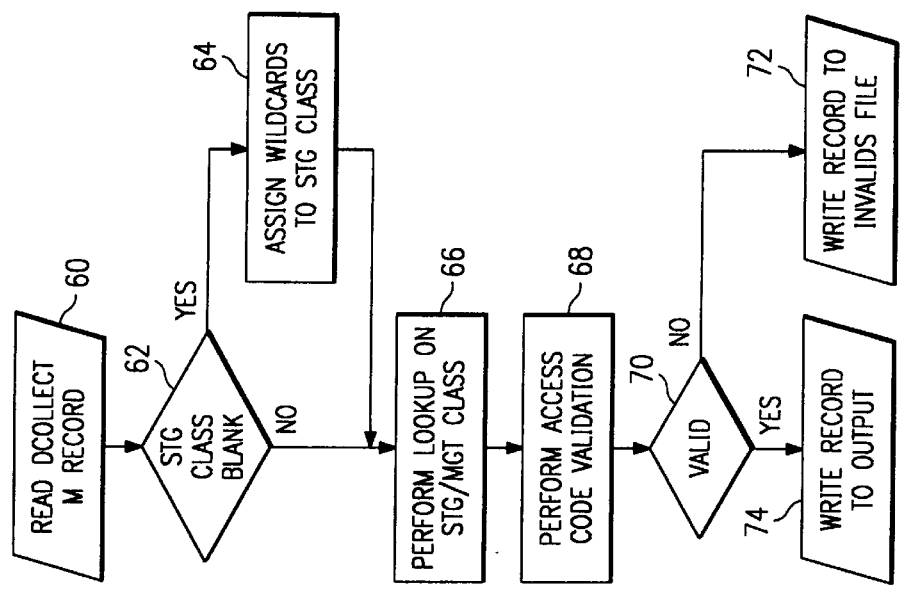
FIG. 4
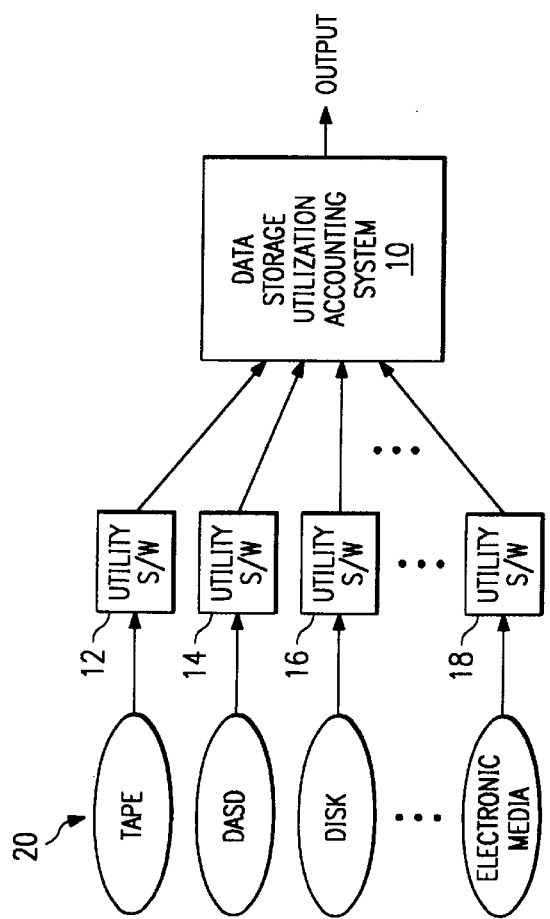
FIG. 1
FIG. 3

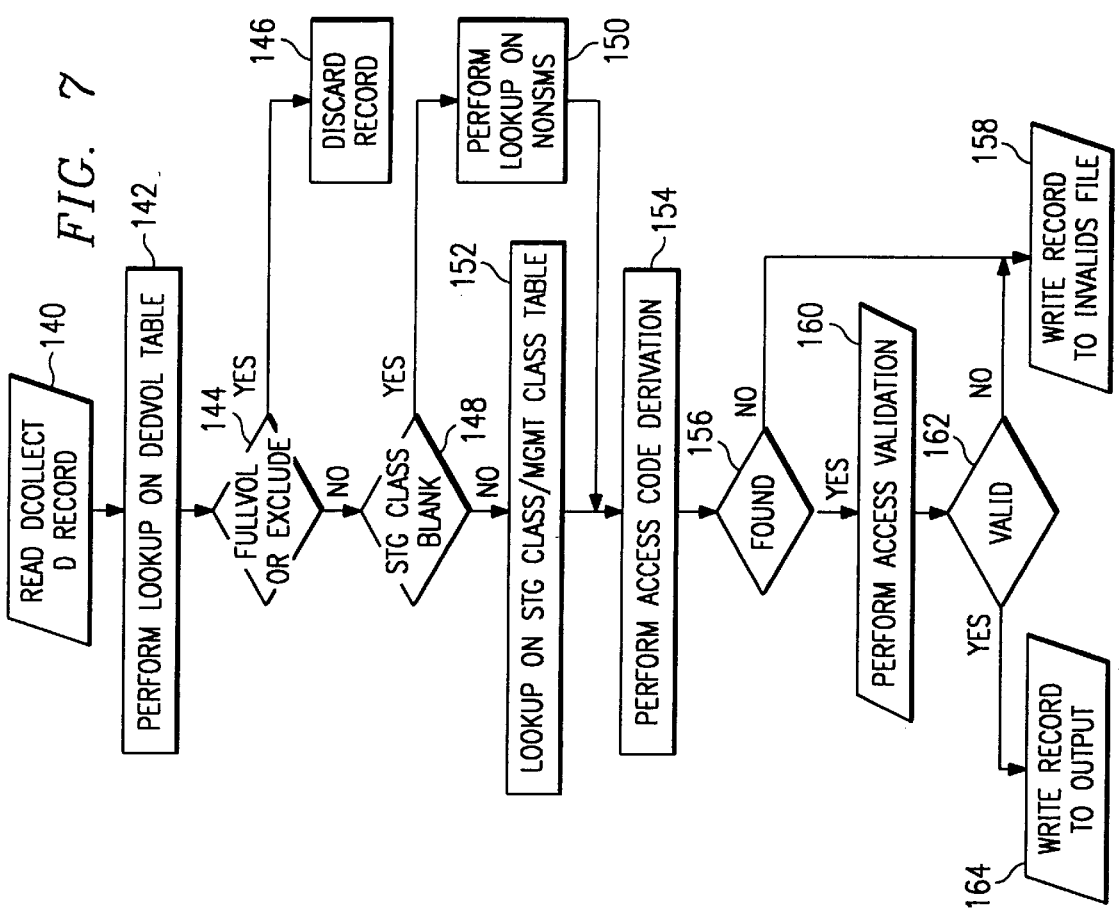
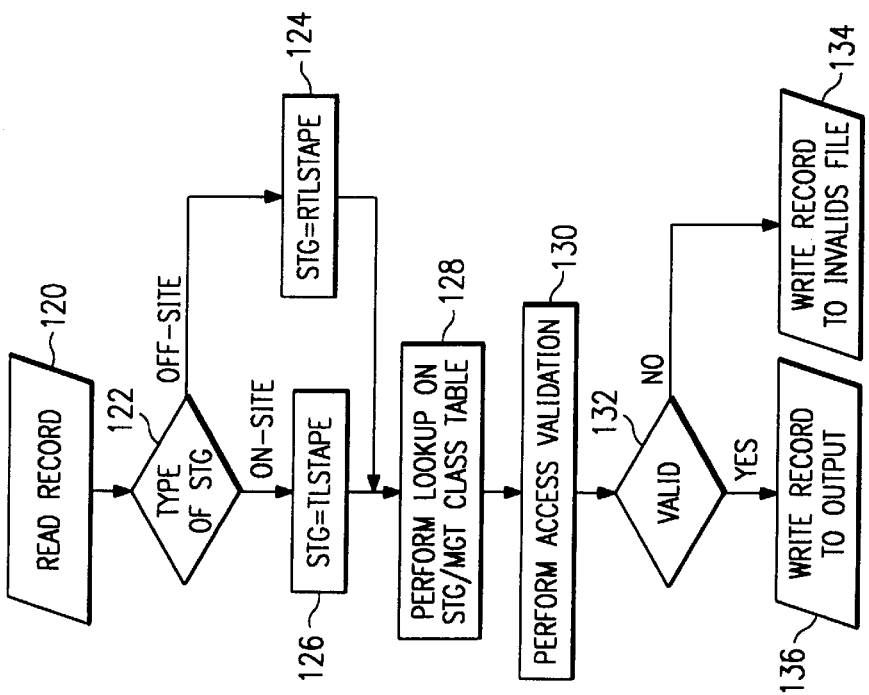

SYSTEM AND METHOD FOR ACCOUNTING OF COMPUTER DATA STORAGE UTILIZATION

CROSS-REFERENCE TO RELATED APPLICATION

This Application is related to U.S. patent application Ser. No. 08/609,694 entitled "System and Method for Deriving Financial Responsibility Identification".

TECHNICAL FIELD OF THE INVENTION

This invention is related in general to the field of accounting software. More particularly, the invention is related to a data storage utilization accounting system.

BACKGROUND OF THE INVENTION

For companies that provide computing and data processing services to customers, means must be provided to account for the data storage cost in addition to the data processing and computing costs in order to accurately allocate the cost of running the company's various cost centers to the customer accounts. This practice is also known as "internal charge-back."

Traditionally, data storage is provided on DASDs (direct access storage devices), tapes, optical disks, and other hardware media. The usage of each type of hardware media is monitored and recorded by utility software programs, such as IDCAMS and Dcollect by IBM (International Business Machines), and DMS/OS (Disk Management System) by Sterling Software for DASD; and TMS (Tape Management System) by Computer Associates, TMC (Tape Management Catalog) by Legent Software, and TLS (Tape Library System) by EDS (Electronic Data Systems Corporation) for tape storage devices. These utility software gather data storage utilization statistics for each storage device, which are then used to compute the number of DASD, tape cartridges, tape reels, optical disks, etc. Subsequently, the usage cost of the storage devices are computed based on the number of characters or bytes stored on these devices.

This traditional way of accounting for data storage provides no incentive to incorporate new and faster storage technology. As new electronic storage media become available and the range of data access speeds becomes broader, it is no longer as meaningful to base accounting and price determination solely on the number of cartridges, reels, characters, or bytes.

Accordingly, a need has arisen to account for and price data storage on a more accurate and realistic level that is not significantly affected by the arrival of new data storage technology.

SUMMARY OF THE INVENTION

In accordance with the present invention, a data storage utilization accounting system and method are provided which eliminate or substantially reduce the disadvantages associated with prior systems and methods.

In one aspect of the invention, a system and method of accounting and billing for data storage on a plurality of data storage devices are provided. The data storage is mapped to a number of service levels, which are defined by varying data access and retrieval speeds. Therefore, instead of accounting and billing for data storage solely on the basis of the quantity of data stored, it is done on the basis of data access and retrieval speeds required by each data storage application and the number of days the data resides at each service level.

In another aspect of the invention, a plurality of data elements are received from a number of data storage utility software programs. The data elements describe the data storage device and storage utilization statistics generated by the operating system and a storage management software. The data elements, along with some support tables, provide a service level mapping for the data storage, from which billing information may be obtained.

In yet another aspect of the invention, at least three service levels may be defined: the first service level providing a fast data access and retrieval speed, the second service level providing a medium data access and retrieval speed, and the third service level providing a slow data access and retrieval speed.

BRIEF DESCRIPTION OF THE DRAWINGS

For a better understanding of the present invention, reference may be made to the accompanying drawings, in which:

FIG. 1 is a top level block diagram illustrating the environment in which a preferred embodiment of the data storage utilization accounting system constructed in accordance with the teachings of the present invention operates;

FIG. 3 is an exemplary table illustrating the service levels;

FIG. 4 is an exemplary flowchart of processing a Dcollect M record;

FIG. 6 is an exemplary flowchart of processing a record on tapes; and

FIG. 7 is an exemplary flowchart of processing a Dcollect D record.

DETAILED DESCRIPTION OF THE INVENTION

Figure 2:
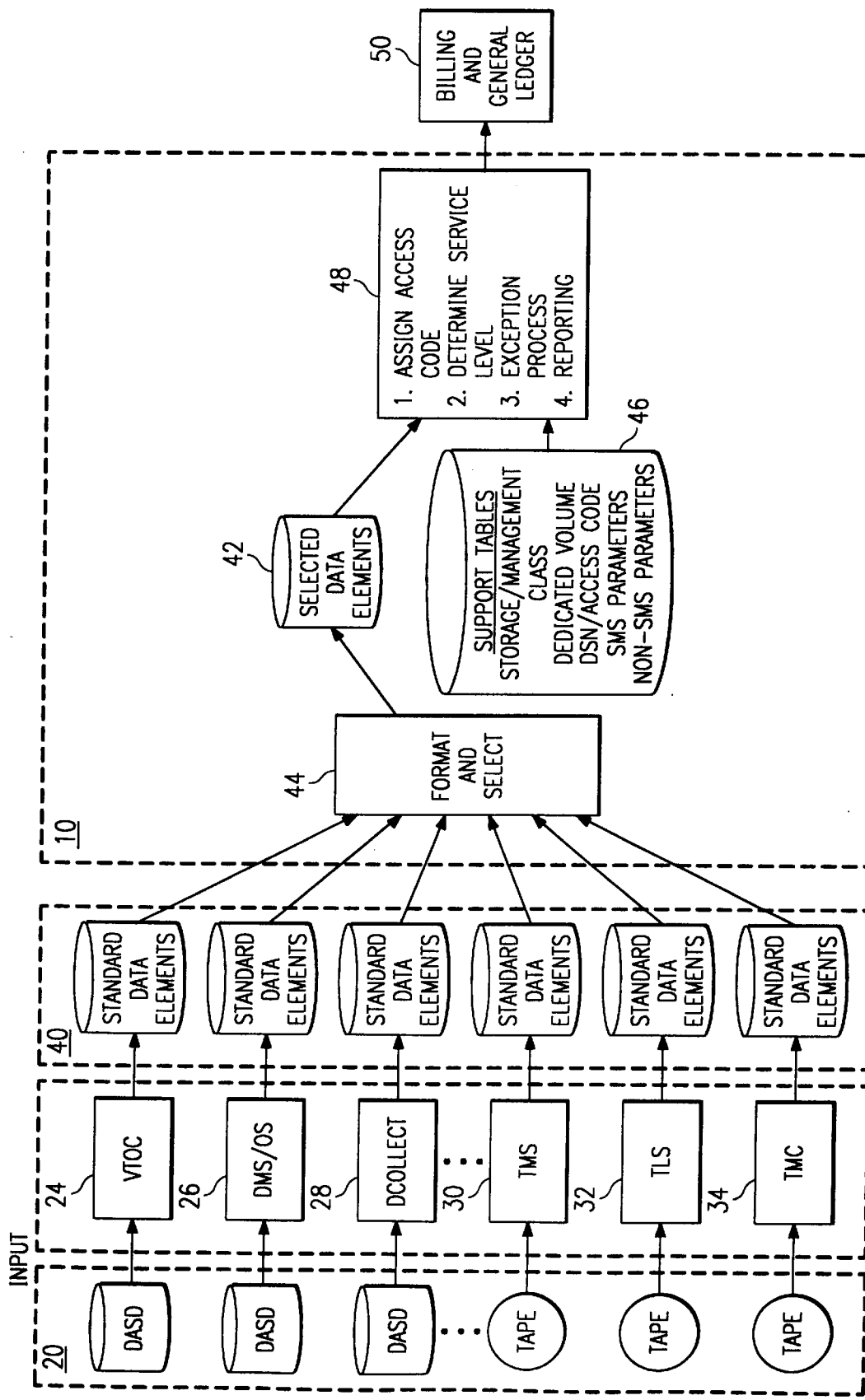
FIG. 2 is a more detailed block diagram of a preferred embodiment of the data storage utilization accounting system and the operating environment.

The preferred embodiment(s) of the present invention is (are) illustrated in FIGS. 1–7, like reference numerals being used to refer to like and corresponding parts of the various drawings.

Referring to FIG. 1, an embodiment of a data storage utilization accounting system 10 is shown with the environment in which it operates. Data storage utilization accounting system 10 receives input from utility software 12–18 that monitors and records the utilization of data storage devices 20, such as tape, DASD (direct access storage device), optical disks, memory and other electronic storage media of varying speeds and capacities. Utility software 12–18 also scans the storage devices for data recorded by the operating system and storage management software that provide usage information. This information is provided to data storage utilization accounting system 10 for processing. An example of a storage management software is the Storage Management Subsystem (SMS) program by IBM.

The output generated by data storage utilization accounting system 10 may be in the form of predefined or adhoc reports and data records, which may be used for billing and budgeting purposes. More specifically, when data storage is used to service the customers, data storage utilization accounting system 10 may be used for internal charge-back to allocate the cost for operating and maintaining the data storage devices to the customer.

FIG. 2 is a more detailed block diagram of data storage utilization accounting system 10. As described above, a plurality of data storage devices 20 are monitored and accessed by utilization software 24–34. These software include: a VTOC (Volume Table of Contents) scan done by IDCAMS by IBM, DMS/OS (Disk Management System) by Sterling Software, and Dcollect by IBM for DASD; and TMS (Tape Management System) by Computer Associates, TMC (Tape Management Catalog) by Legent Software, and TLS (Tape Library System) by EDS for tape storage devices. All of these utility software access the storage media and obtains a set of industry standard data elements 40 from the storage devices that were generated and written by the operating system and the storage management software. From the set of industry standard data elements 40 provided by the utility software, a subset of data elements 42 are selected and reformatted into records for usage by data storage utilization accounting system 10, as shown in block 44.

Selected data elements 42 include:
1. Data Set Name—standard data set identifier consisting of a maximum of 44 characters. The Data Set Name may include a number of levels delineated by periods.
2. Volume Serial Number—storage device identification number.
3. System Identification—logical identification of the computer system, which also provides geographical or site information.
4. Data and Time—the date and time that the data set was last accessed.
5. Quantity—the amount of storage space the data set occupies in units of gigabytes.
6. Accounting Code—identifies the accounting or billing number.
7. User Defined Parameters—SMS parameters, including storage class and management class.

From these data elements 42 and information from support tables 46, data storage utilization accounting system 10 performs a number of tasks that can be grouped into four main categories:
1. Assign access code
2. Determine service level
3. Exception processing
4. Reporting Note that these tasks are not necessarily performed in this order.

The access code may be derived from three sources or processes in a preferred embodiment. The first source may be from the Data Set Name (DSN)/Access Code Table, one of support tables 46. The data set name may have multiple levels or tiers demarcated by "." between the levels. The data set name is used to look up the corresponding access code in the DSN/Access Code Table. The access code may also be determined by referring to the Dedicated Volume Table used to identify full volumes to be billed as dedicated volumes or work packs to a specific account. The access code may also be manually assigned to override access code derived from either the DSN/Access Code Table or the Dedicated Volume Table.

From the selected data elements 42 and support tables 46, service levels and the corresponding billing element may be determined. The three service levels are distinguished by access retrieval speed. Service level 1 may be defined as providing very rapid and immediate access and transfer rates. Service level 1 is used for critical path application files or highly interactive files. Customer services that may require this level of data storage include automatic teller machines and airline reservation systems, for example, where data are required to be "on-line" and immediately accessible.

Service level 2 may be defined as providing maintenance batch functions that update the databases and backup the data. These include non-critical path applications or low access historical files. Service level 2 functions are typically run at night to update and backup data that were changed, added, or deleted during the day.

Service level 3 may be defined as providing the level of data storage that is not time critical, for example data archives or backups. At level 3, it is permissible to have respond time measured in days, for example.

Note that the number of service levels and their definition may be tailored according to the nature of services a company provides. It is very conceivable to expand the number of levels to four, five or more service levels with each specifying a different access and response requirement. With the development and introduction of faster and faster data storage media, the range of access retrieval times is broadened, and service level definitions may be adjusted accordingly.

Referring to FIG. 3, a portion of a Storage/Management Class Table is shown illustrating the service level concept of billing for data storage. A similar table may also be used to aid managers, and sales and marketing personnel to identify the services available and to select the data storage strategy best suited for each customer. In the first column of the table, an identifier string is used to specify storage classes. The storage class identifies what type of storage device or medium is used. The second column specifies the corresponding management classes for the storage classes. For each storage and management class combination, a data storage strategy is described in the table.

For example, for the storage and management class listed in the first row, the data spend zero days at service levels 1 and 2, but indefinitely (indicated by 999 days) at service level 3. Therefore, data in this storage and management class are never time critical. In the second row, the data indicated by the specified storage and management class spend the first day after any data access at service level 1, and thereafter three days at service level 2, and at service level 3 thereafter. Therefore, data in this storage and management class require rapid access and retrieval time only on the first day after a data access of the data set, medium access and retrieval time the subsequent three days, and then low level access and retrieval time indefinitely.

Accordingly, as a function of the service levels, a billing element may be derived from accessing the Storage/Management Class Table, the last access date for the data set, and the current date. The length of time that the data has resided at a particular service level of storage can then be computed by subtracting from the current date the date of the last access. The billing element is equivalent to a code used to indicate service level 1, 2, or 3. Non-SMS data (Non-Storage Management Subsystem data) are assigned a billing element based on predefined storage devices that are specified in a Non-SMS Table and the service provided by these devices, or the Dedicated Volume Table if the device is dedicated to a predefined account. The assignment of the billing element is described in more detail below.

Data storage utilization accounting system 10 also provides exception processing. A process is provided to identify nonconforming data and formats and to suspend the data record for manual review. The non-conforming records may be written out to a file or files for this purpose. As a result of the manual review, the input data may be modified to conform to predefined formats, or changes may be made in support tables 46 to permit processing of the data. The exception processes ensures data from all sources are collected, read, and processed.

The reporting function of data storage utilization accounting system 10 provides an output of billing elements each day. The billing elements may be used to debit each account, summarize usage, perform trending analysis, etc. by the billing and general ledger processes. The reporting function may also provide summaries on a weekly or another predetermined period. Users may also define ad hoc reports for periodic reporting.

FIGS. 4–7 described below provide exemplary flow for processing a number of specific record types. FIG. 4 describes the process flow for processing Dcollect M records. The process first reads the Dcollect M record, as shown in block 60. Recall that these records now include selected data elements and have been reformatted. The storage/management (STG/MGT) class field in the record is checked for its contents, as shown in block 62. If it is empty, then a predetermined "wild card" code is assigned to the record as its storage/management class field, as shown in block 64. Subsequently in block 66, the Storage/Management Class Table is accessed to look up and compute the billing element. The billing element is then written to the record. The access code is then obtained in the DSN/Access Code Table based on the Data Set Name. If it is found in the Table, then it is validated, as shown in block 68. If the code is not valid, then the record is flagged as an invalid record and written out to the invalid record file, as shown in block 72. If the access code is valid, then the record is provided as an output.

Figure 5:
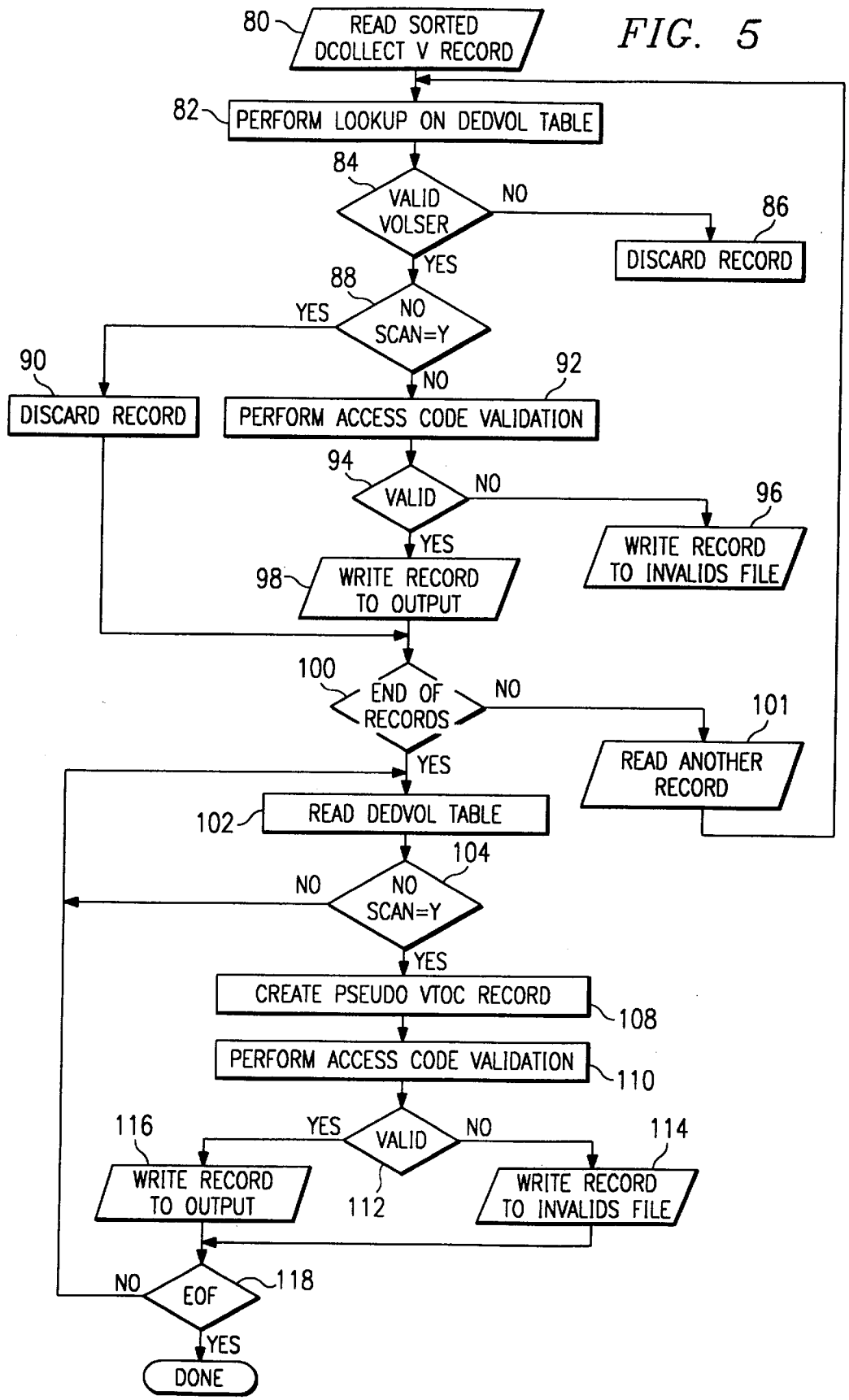
FIG. 5 is an exemplary flowchart of processing a Dcollect V record.

FIG. 5 shows the exemplary process flow for a Dcollect V Record, DMS/OS record, or a dedicated volume data set. These records are generated one per hour, so that twenty-four records are generated per day. The current process uses the record with the highest data quantity for each day. These records have been presorted and the record with the highest data quantity selected. More than one day's worth of records may be processed at one time in the current process. TABLE A below provides an exemplary instance of a Dedicated Volume Table, references to which may aid in the understanding of the V record process.

TABLE A

| Col. | Element | Description |
| --- | --- | --- |
| 1-1 | * | Comment - ignore record |
| 1-6 | VOLSER | VOLSER or Pattern |
| 7-7 | | Filler |
| 8-8 | Flag Type | 'D' = Dedicated |
| | | 'Work' = Work (Default) |
| | | 'X' = Acctg. Exclude |
| 9-9 | | Filler |
| 10-15 | Access Code | |
| 16-16 | | Filler |
| 17-20 | Billing Element | Billing Element Code |
| 21-21 | | Filler |
| 22-31 | Volume Reclaim Date | Resource Reclaim Date |
| 32-32 | | Filler |
| 33-35 | Percent Billed | e.g. 100 |
| | | 0 will abend program |
| 36-37 | | Filler |
| 38-43 | Override Amount | Gbytes to bill |
| | | 0 = V Record Input value |
| | | e.g. 0.000 |

TABLE A-continued

| Col. | Element | Description |
| --- | --- | --- |
| 44-44 | | Filler |
| 45-45 | Non Scan Volume | 'Y' Generate pseudo Vrec for non scan volumes |
| 58-100 | DSN Override | High level dsn nodes (3 levels max) Default: 'VOLUME. (volser)' |

Note that certain fields in the Dedicated Volume Table are required while others are optional. For example, VOLSER, flag type, access code, and billing element are required data elements. The Description column in TABLE A provides an explanation of the data in the Dedicated Volume Table.

Therefore, the record with the highest data storage quantity is read, as shown in block 80. A lookup function is used to locate the Volume Serial Number (VOLSER) of the record in the Dedicated Volume (DEDVOL) Table, as shown in block 82. If the Volume Serial Number is not found in the Table, indicating that the Volume Serial Number is not valid in block 84, then the record is discarded and the process is discontinued, as shown in block 86. Else, in block 88, a flag type field in the Dedicated Volume Table is checked to see whether the volume was on-line during the scanning period. If the flag indicates that the volume was not on-line or was off-line, then the volume should not have been scanned to create the record. If NO SCAN is true, then the record is discarded, as shown in block 90, and if the end of records is not reached, as determined in block 100, another record is read in block 101.

Thereafter, if the Dedicated Volume Table indicates that the present volume should be scanned, then the billing element recorded in the Dedicated Volume Table for the volume is written to the record. The access code is thereafter validated by looking up the Data Set Name in the DSN/Access Code Table, as shown in blocks 92 and 94. If the access code is not valid, then the record is written out as an invalid record to the invalids file, as shown in block 96. If the code is valid, then the record is provided as an output, as shown in block 98.

Subsequently in block 100, the input is checked to see if there is at least one other record to be read. Recall that the record with the highest data storage quantity for each day is used in the process, and records of multiple days may be processed at the same time. If the end of records has not been reached, another record is read in block 101 and the process loops back to block 82 to continue processing the input records.

If the end of records has been reached in block 100, then all the records that were indicated in the Dedicated Volume Table as volumes that should have been scanned have been processed. Subsequent processing concerns those records of volumes that were off-line while scanning or those volumes that were scanned but were not intended to be scanned as indicated by the NO SCAN field in the Dedicated Volume Table.

The entries in the Dedicated Volume Table are read until an entry with NO SCAN true is reached, as shown in blocks 102 and 104. A pseudo VTOC record is then created for the NO SCAN volume with information from the Dedicated Volume Table in block 108, including the access code and billing element. An access code validation is then performed in block 110. If the access code is not valid, the record is written to the invalids file for exceptions processing in block 114, else the record is written to the output, as shown in block 116. The Dedicated Volume Table is then examined to determine if the end or EOF (end-of-file) has been reached in block 118. If there are more entries to be processed, the process returns to block 102 to continue to look for volumes with the NO SCAN designation. If the end has been reached, the process ends.

FIG. 6 shows an exemplary flow for processing all tape records. Tape storage does not require a management class designation in the present embodiment. The billing element is determined based on whether the storage was on-site or off-site, for example. The record is read, as shown in block 120. A determination is made as to whether it is an on-site or off-site usage by reading a predefined field in the record, as shown in block 122. If it is an off-site tape or cartridge, the storage (STG) class of RTLSTAPE is assigned to the record, as shown in block 124. If it is an on-site tape or cartridge, then the storage class of TLSTAPE is assigned to the record, as shown in block 126. Based on the storage class assignment, a table lookup in the Storage/Management (STG/MGT) Class Table is used to determine the proper billing element which is written to the record, as shown in block 128. The access code is then determined by referring to the DSN/Access Code Table and validated, as shown in blocks 130 and 132. If the access code is valid, the record is written to the output, otherwise it is written to the invalids file, as shown in blocks 134 and 136.

Referring to FIG. 7, a Dcollect D record, a VTOC (Volume Table of Contents) scan, or DMS record process flow is shown. VTOC is a table on a DASD that describes each data set on the volume. In blocks 140 and 142, the record is first read and then the Volume Serial Number is used to determine whether it is a dedicated volume by accessing the Dedicated Volume Table. If the data set is found in the Dedicated Volume Table or if a flag field of the record indicates that it is to be excluded or it is a dedicated full volume (FULLVOL), the record is discarded, as shown in blocks 144 and 146. Otherwise, if the storage class field is empty, as determined in block 148, then the Volume Serial Number is used to perform table lookup in the Non-SMS Table, as shown in block 150. An exemplary Non-SMS Table is shown in TABLE B.

TABLE B

| COL. | Element |
|---|---|
| 1-1 | * Comment |
| 1-6 | VOLSER |
| 7-7 | Filler |
| 8-8 | Reserved |
| 9-9 | Filler |
| 10-13 | Billing Element |
| 14-100 | Comment Field |

The Non-SMS Table provides the billing element for the specified Volume Serial Number (VOLSER), which is then written to the record. If there is no entry in the Table for the specified Volume Serial Number, then a default billing element is written to the record. For example, a billing element specifying service level 1 may be specified as default.

On the other hand, if a storage class is specified in the record, then it is used to look up the billing element in the Storage/Management (STG/MGMT) Table, as shown in block 152. The billing element is then assigned based on the number of days since the last data access and written to the record. Thereafter in block 154, the access code is derived based on a proprietary method that is the subject matter of a related patent application titled System and Method for Deriving Financial Responsibility Identification, Ser. No. 08/609,694, also assigned to EDS. If the access code is not found in the DSN/Access Code Table, then the record is written out to the invalids file, as shown in blocks 156 and 158. If the access code is found, then a determination is made as to its validity, as shown in blocks 160 and 162. If the access code is not valid, then the record is also written to the invalids file. If the code is valid, the record is provided as output.

Accordingly, data storage is accounted for and billed on a more realistic and cost effective manner based on the data access retrieval requirements of the customer. Data storage access and retrieval has historically been faster and more economical as new technology becomes available. Instead of basing billing on the storage technology, data storage utilization accounting system 10 revolutionary uses access and retrieval speed demands as the basis for billing. By using this new process, storage management may manage hardware independently of customer requested media type, as long as it meets the defined service requirements. Storage management would have several options from a hardware support position to meet the access and retrieval speed requirements, thus making more cost effective decisions.

From the customer's point of view, he/she is able to make data storage decisions in a more strategic manner by tailoring to his/her business needs without having to be concerned with storage media types. Because the media type can be selected in a more cost effective manner, the customer is able to enjoy the savings without sacrificing his/her business requirements.

Although the present invention and its advantages have been described in detail, it should be understood that various changes, substitutions and alterations can be made therein without departing from the spirit and scope of the invention as defined by the appended claims.

What is claimed is:

1. An automated method of accounting and billing for data storage on a plurality of data storage devices, the plural data storage devices allowing access to stored data, each of the plural storage devices having an associated data access and retrieval speed, the method comprising the steps of:

defining a plurality of service levels each characterized by a range of data access and retrieval speeds;

determining at least one service level to store data;

storing the data according to said at least one service level; and billing for said data storage based on said at least one service level.

2. The method, as set forth in claim 1, wherein the step of billing for said data further comprises the step of computing the time the stored data resides at each service level.

3. The method, as set forth in claim 2, wherein the step of billing for said data further comprises the step of determining a billing element based on said computed time and said service levels.

4. The method, as set forth in claim 1, further comprising the steps of:

defining a first service level for fast data access and retrieval speed;

defining a second service level for medium data access and retrieval speed; and defining a third service level for slow data access and retrieval speed.

5. The method, as set forth in claim 4, further comprising the steps of:

determining a first number of days, the first number of days comprising the number of days that said data resides at said first service level;

determining a second number of days, the second number of days comprising the number of days that said data resides at said second service level; and determining a third number of days, the third number of days comprising the number of days that said data resides at said third service level.

6. The method, as set forth in claim 2, wherein the step of billing for said data further includes the step of storing the computed time and the service level in a storage/management class table and determining a billing element from the storage/management class table.

7. The method, as set forth in claim 1, further comprising the steps of:

receiving a predetermined set of data elements describing the data stored on each data storage device, the set of data elements including a data set name, a storage class, and a management class;

accessing an account code table for determining an account code based on the data set name; and determining a billing element based on said storage class, management class, and said one or more service levels.

8. The method, as set forth in claim 7, further comprising the steps of:

receiving a volume serial number;

accessing a dedicated volume table for locating said volume serial number; and obtaining a billing element from the dedicated volume table when said volume serial number is located therein.

9. The method, as set forth in claim 1, further comprising the steps of:

reading a plurality of records, each record having a predetermined format and a predetermined set of data elements, the data elements describing the data stored on each data storage device; and processing each of said plurality of records and adding a billing element to each record, the billing element based on said service levels and said data elements; and outputting said plurality of records.

10. The method, as set forth in claim 9, further comprising the step of generating output reports with the plurality of records.

11. An automated method of accounting and billing for data stored on a plurality of data storage devices, each storage device allowing access to the stored data at a predetermined access and response speed, the method comprising the steps of:

determining a billing element for the stored data as a function of the last time of a predetermined data access and a service level specifying a range of data access and response speeds;

storing the data according to the service level; and accounting for said data storage based on the billing element.

12. The method, as set forth in claim 11, further comprising the steps of:

defining a first service level for fast data access and retrieval speed;

defining a second service level for medium data access and retrieval speed; and defining a third service level for slow data access and retrieval speed.

13. The method, as set forth in claim 11, further comprising the step of determining a data storage strategy describing a number of days said stored data resides at each service level.

14. The method, as set forth in claim 11, further comprising the steps of:

receiving a predetermined set of data elements describing the data on each data storage device, the set of data elements including a data set name, a storage class, and a management class;

accessing an account code table for determining an account code based on the data set name; and determining a billing element based on said storage class, management class, and said service level.

15. The method, as set forth in claim 14, further comprising the steps of:

receiving a volume serial number;

accessing a dedicated volume table for locating said volume serial number; and obtaining a billing element from the dedicated volume table when said volume serial number is located therein.

16. The method, as set forth in claim 11, further comprising the steps of:

reading a plurality of records, each record having a predetermined format and a predetermined set of data elements describing the data on each data storage device; and processing each of said plurality of records by adding a billing element to each record as determined on the basis of said service level and said data elements; and outputting said plurality of records.

17. A method of accounting and billing for data storage on a plurality of data storage devices, each data storage device having an access and retrieval speed, each data storage device being monitored by utility software to provide a set of data elements describing the data storage, comprising the steps of:

formatting a select set of data elements generated by said utility software and producing a plurality of records;

reading said plurality of records;

processing each of said plurality of records and providing the data storage to one of the data storage devices according to one of several service levels, said service levels specifying ranges of varying data access and retrieval speeds;

adding a billing element to each record as determined on the basis of said service level and said select set of data elements; and outputting said plurality of records.

18. The method, as set forth in claim 17, further comprising the steps of:

receiving a last data access date and a current date; and computing time elapsed since the last data access date of the data storage to determine said service levels.

19. The method, as set forth in claim 18, further comprising the step of determining a billing element based on said computed time elapse and said service levels.

20. The method, as set forth in claim 19, further comprising the steps of:

determining a first number of days comprising the number of days said data storage resides at said first service level;

determining a second number of days comprising the number of days said data storage resides at said second service level; and determining a third number of days comprising the number of days said data storage resides at said third service level.

21. The method, as set forth in claim 20, further comprising the step of determining a data storage strategy describing a number of days said data storage resides at each service level.

22. The method, as set forth in claim 17, further comprising the steps of:
defining a first service level for fast data access and retrieval speed;
defining a second service level for medium data access and retrieval speed; and
defining a third service level for slow data access and retrieval speed.

23. The method, as set forth in claim 17, further comprising the steps of:
receiving said select set of data elements including a data set name, a storage class, and a management class;
accessing an account code table for determining an account code based on the data set name; and
determining a billing element based on said storage class, management class, and said service level mapping.

24. The method, as set forth in claim 23, further comprising the steps of:
receiving a volume serial number;
accessing a dedicated volume table for locating said volume serial number; and
obtaining a corresponding billing element from the dedicated volume table when said volume serial number is located therein.

25. A system for accounting and billing of data storage on plural storage devices, the storage devices having associated data storage utility software, each storage device having an access and retrieval speed, the system comprising:
a data element receiver for receiving a plurality of data elements produced by the data storage utility software, said data elements describing data storage utilization, said data element receiver producing a plurality of records, each record having a select set of said received data elements, each data element comprising a data set name, volume serial number, and storage class;
an access code table providing an access code based on a data set name; and
a storage/management class table providing one of plural service levels based on storage classes, each service level associated with a range of access and retrieval speed, said service level providing a billing element.

26. The system, as set forth in claim 25, further comprising a dedicated volume table providing a billing element based on said received volume serial number.

27. The system, as set forth in claim 25, wherein said received data elements include a storage/management class and said storage/management class table providing plural service levels based on storage and management classes.

28. The system, as set forth in claim 27, wherein said storage/management class table includes a first billing element for a first number of days associated with data storage at a first service level, a second billing element for a second number of days associated with data storage at a second service level, and a third billing element for a third number of days associated with data storage at a third service level.

29. An automated method of accounting and billing for data storage comprising the steps of:
providing a plurality of data storage devices, each of the plurality of data storage devices having an associated data access and retrieval speed;
defining a plurality of service levels characterized by the data access and retrieval speed of said plural storage devices;
determining the service levels of the data to be stored on the plurality of data storage devices;
storing the data on at least one of the plurality of data storage devices according to one or more service levels;
determining a frequency of access associated with the data on each of the service levels; and
billing for the data storage based on the service levels and the frequency of access.

* * * * *